(12) United States Patent
Hamada

(10) Patent No.: US 12,528,345 B2
(45) Date of Patent: Jan. 20, 2026

(54) VEHICLE DOOR

(71) Applicant: SUBARU CORPORATION, Tokyo (JP)

(72) Inventor: Yuji Hamada, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/918,174

(22) Filed: Oct. 17, 2024

(65) Prior Publication Data

US 2025/0144989 A1 May 8, 2025

(30) Foreign Application Priority Data

Nov. 6, 2023 (JP) .................. 2023-189235

(51) Int. Cl.
*B60J 10/86* (2016.01)
*B60J 5/04* (2006.01)
*B60J 10/21* (2016.01)
*B60J 10/36* (2016.01)

(52) U.S. Cl.
CPC ............. *B60J 10/86* (2016.02); *B60J 5/0402* (2013.01); *B60J 10/21* (2016.02); *B60J 10/36* (2016.02)

(58) Field of Classification Search
None
See application file for complete search history.

(56) References Cited

U.S. PATENT DOCUMENTS

| | | | |
|---|---|---|---|
| 8,458,959 B2 * | 6/2013 | Ohtake | B60J 10/86 49/502 |
| 8,851,552 B2 * | 10/2014 | Katayama | B60J 10/21 296/146.2 |
| 9,649,922 B2 * | 5/2017 | Amagai | B60J 10/25 |
| 9,845,001 B1 * | 12/2017 | Kojima | B60J 5/0402 |
| 9,956,858 B2 * | 5/2018 | Sobue | F16J 15/027 |
| 11,148,513 B2 * | 10/2021 | Matsuura | B60J 10/86 |
| 11,207,955 B2 * | 12/2021 | Fujita | B60J 5/0402 |
| 11,220,162 B2 * | 1/2022 | Jeon | B60J 5/0402 |
| 12,240,299 B2 * | 3/2025 | Aoyama | B60J 10/75 |

FOREIGN PATENT DOCUMENTS

| | | | | |
|---|---|---|---|---|
| EP | 2433827 A1 * | 3/2012 | ............ | B60J 5/0402 |
| GB | 2 375 791 A | 11/2002 | | |
| JP | 2003-2069 A | 1/2003 | | |
| JP | 2008230449 A * | 10/2008 | ............ | B60J 5/0402 |

* cited by examiner

*Primary Examiner* — Catherine A Kelly
(74) *Attorney, Agent, or Firm* — TROUTMAN PEPPER LOCKE LLP

(57) ABSTRACT

A vehicle door provided with a weatherstripping includes a sash. The sash includes a first member designed to extend along a roof of a vehicle body, and a second member designed to extend along a pillar of the vehicle body. The weatherstripping includes a first linear section designed to extend along the roof, a second linear section designed to extend along the pillar, and a corner section coupling the first linear section and the second linear section to each other. The first member is obtained through roll forming. The second member is obtained through press forming in such a manner as to include the corner. The second linear section and the corner section lie on the second member. The first linear section and the second linear section are each provided on a side near the corner section with a movement preventing member configured to prevent the weatherstripping from moving.

8 Claims, 6 Drawing Sheets

CABIN ←——→ OUTSIDE

CABIN ←——————→ OUTSIDE

VEHICLE DOOR

CROSS-REFERENCE TO RELATED APPLICATION

The present application claims priority from Japanese Patent Application No. 2023-189235 filed on Nov. 6, 2023, the entire contents of which are hereby incorporated by reference.

BACKGROUND

The disclosure relates to a vehicle door including a sash disposed at an upper part of a door body.

In general, a sash included in a vehicle door is obtained through roll forming or press forming. A sash obtained through roll forming has a smaller sectional area than a sash obtained through press forming.

Such a vehicle door is provided with a weatherstripping extending along the outer edge thereof. The weatherstripping is to be in contact with a vehicle body in a state where an opening provided in the vehicle body is closed by the vehicle door (see Japanese Unexamined Patent Application Publication (JP-A) No. 2003-2069, for example). The weatherstripping is made of an elastic material such as rubber and is to seal between the vehicle body and the vehicle door in the state where the opening is closed by the vehicle door. According to JP-A No. 2003-2069, the weatherstripping is attached to the vehicle door with double-faced adhesive tape.

SUMMARY

An aspect of the disclosure provides a vehicle door with which an opening provided in a vehicle body of a vehicle is configured to be opened and closed. The vehicle door is provided with a weatherstripping that extends along an outer edge of the vehicle door and that is to be in contact with the vehicle body in a state where the opening is closed by the vehicle door. The vehicle door includes a sash disposed at an upper part of a door body. The sash includes a first member and a second member. The first member is designed to extend along a roof of the vehicle body at the opening. The second member is joined to the first member at a position near a corner of the vehicle door and is designed to extend along a pillar of the vehicle body at the opening. The weatherstripping includes a first linear section, a second linear section, and a corner section. The first linear section is designed to extend along the roof of the vehicle body at the opening. The second linear section is designed to extend along the pillar of the vehicle body at the opening. The corner section is curved in such a manner as to couple the first linear section and the second linear section to each other. The first member is obtained through roll forming. The second member is obtained through press forming in such a manner as to include the corner. The second linear section and the corner section lie on the second member. The weatherstripping is attached to the first member and to the second member such that the first linear section and the second linear section are movable in an elongate direction of the weatherstripping. The first linear section and the second linear section are each provided with a movement preventing member on a side near the corner section, the movement preventing member being configured to prevent the weatherstripping from moving relative to the sash.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

According to JP-A No. 2003-2069, since the weatherstripping is attached to the vehicle door with double-faced adhesive tape, the weatherstripping tends to be excessively restrained, exhibiting low followability with respect to the vehicle door. Furthermore, since the entirety of the sash is formed by way of press forming, the sectional area of the sash may not necessarily be reduced over the entirety thereof.

It is desirable to provide a vehicle door that is provided with a weatherstripping exhibiting satisfactory followability with respect to the vehicle door, and that includes a sash having a reduced sectional area in part.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
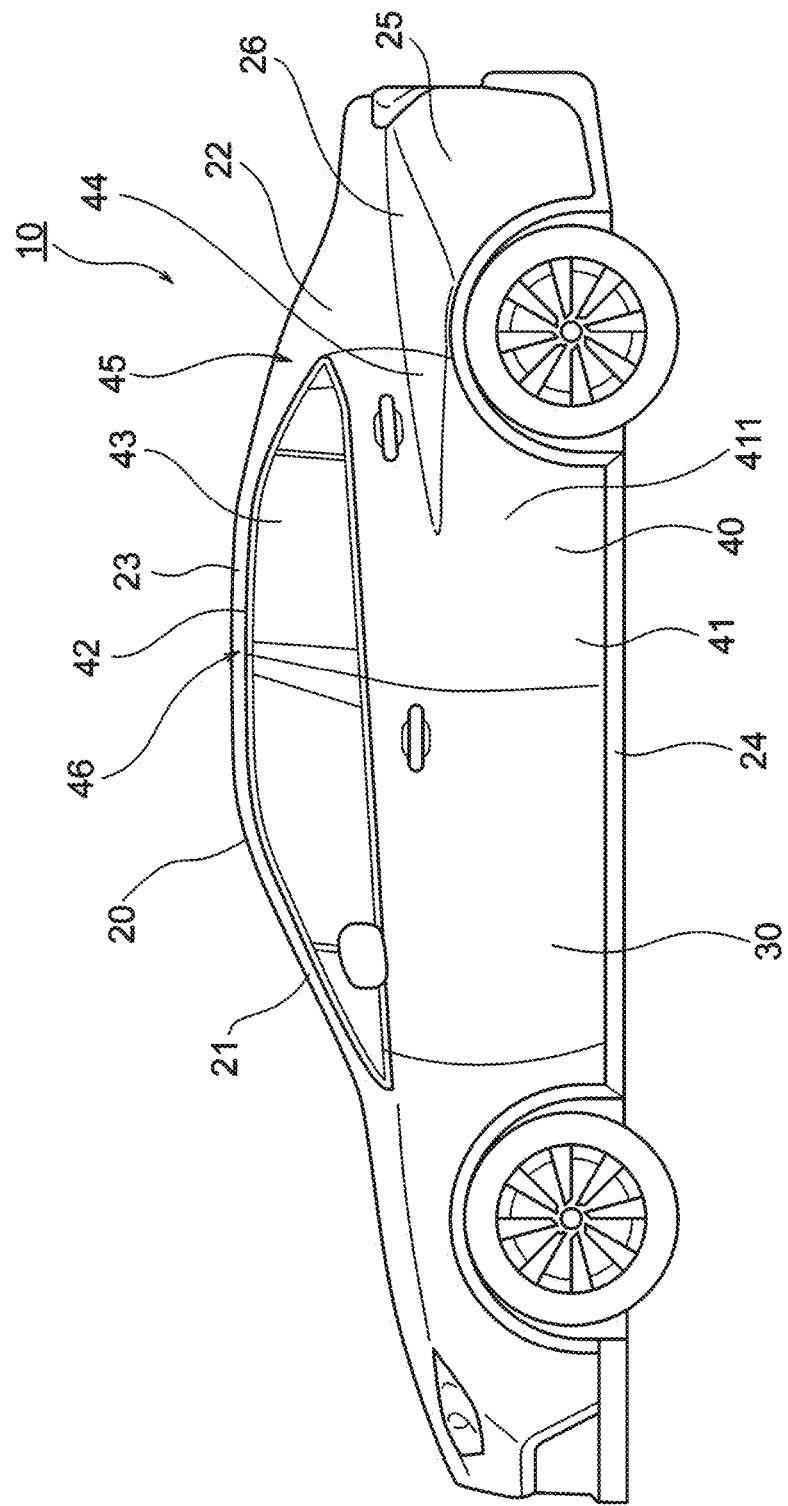
FIG. 1 is a side overview of an automobile vehicle according to an embodiment of the disclosure.
Figure 2:
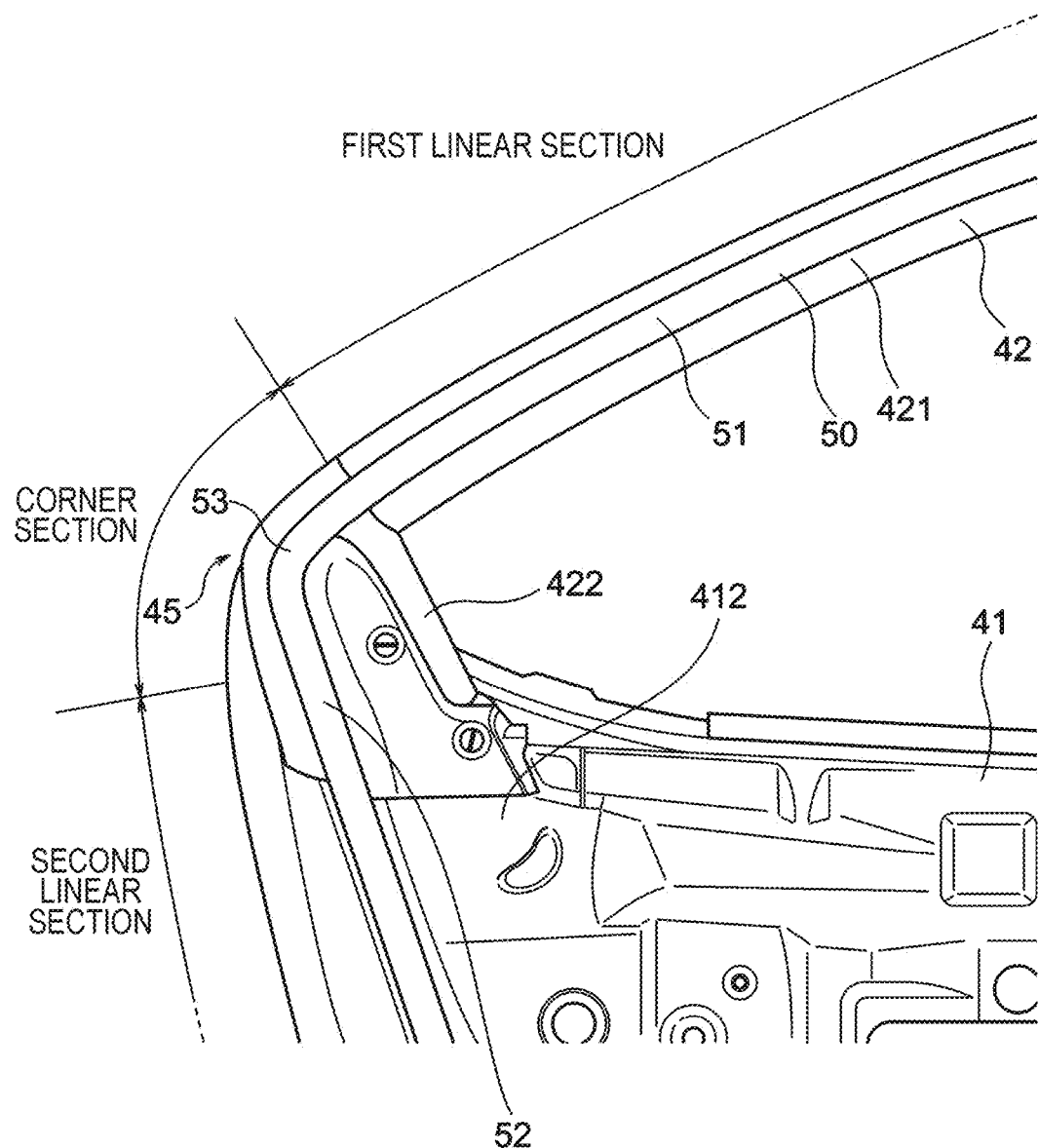
FIG. 2 is a side view of an upper rear part of a vehicle door seen from the vehicle cabin.
Figure 3:
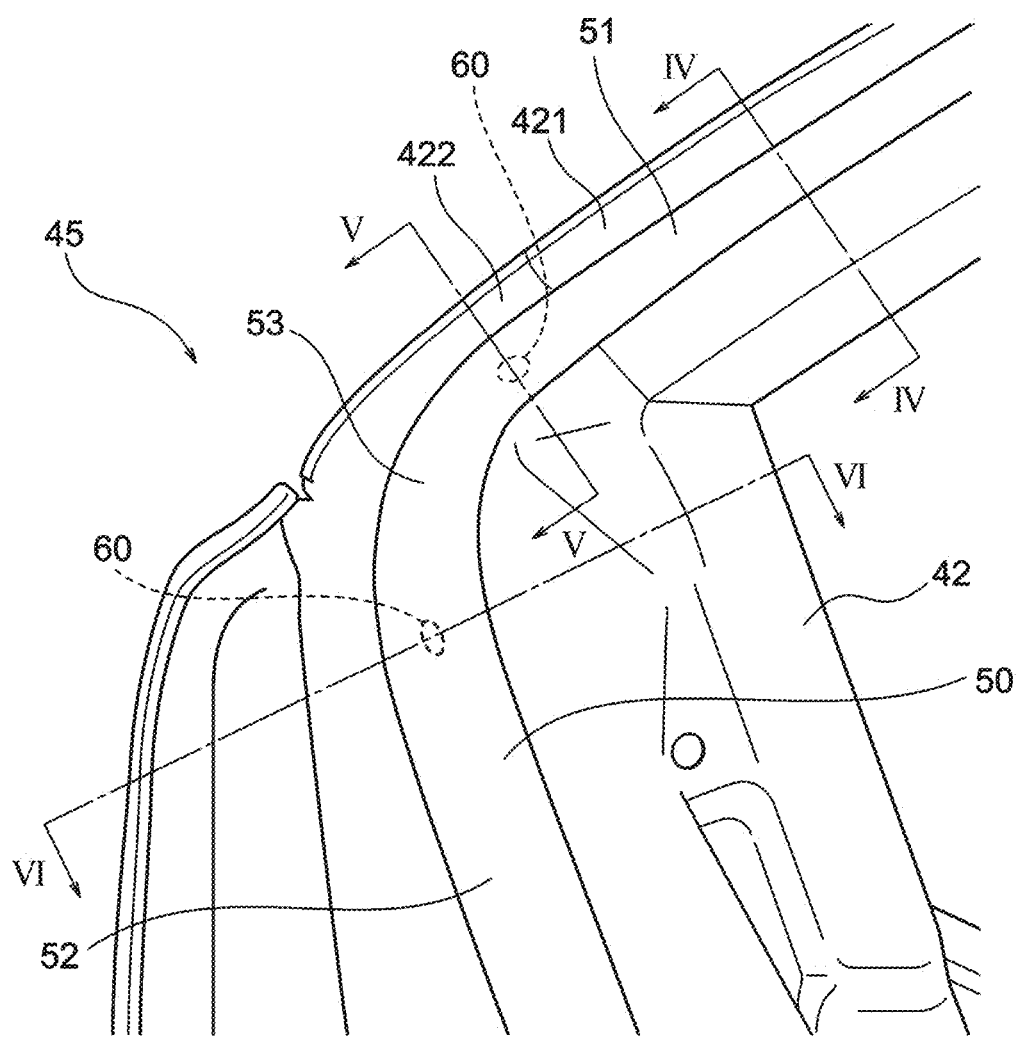
FIG. 3 is an enlarged side view of a corner of the vehicle door seen from the vehicle cabin.
Figure 4:
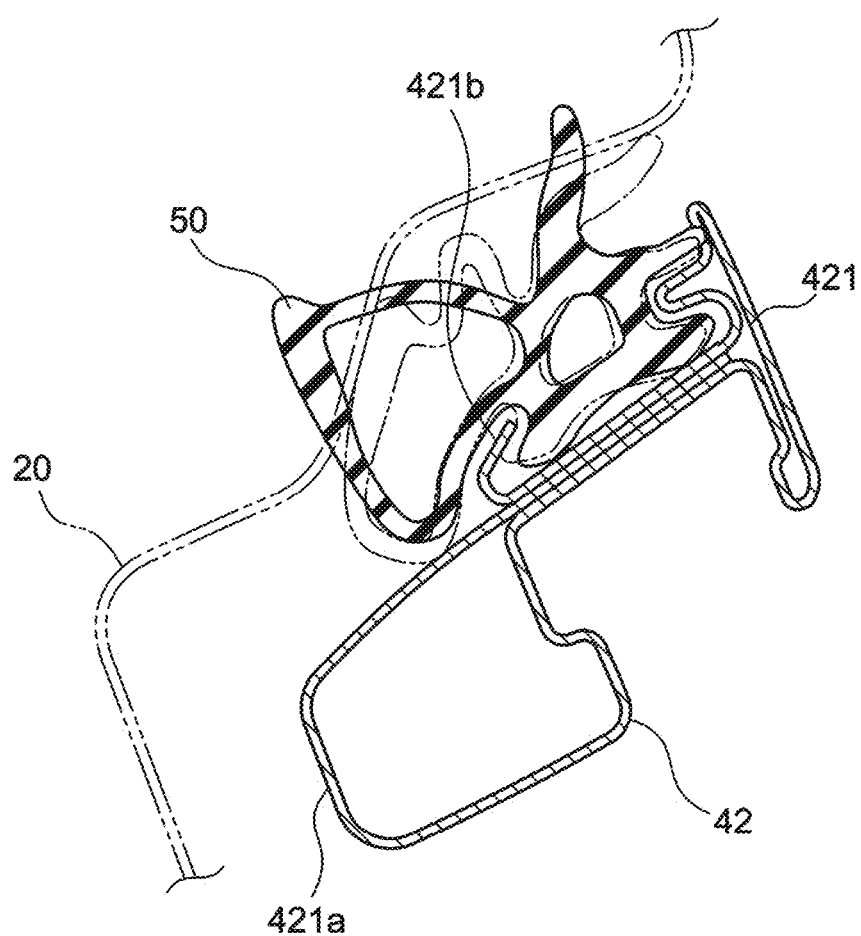
FIG. 4 illustrates a section taken along line IV-IV given in FIG. 2.
Figure 5:
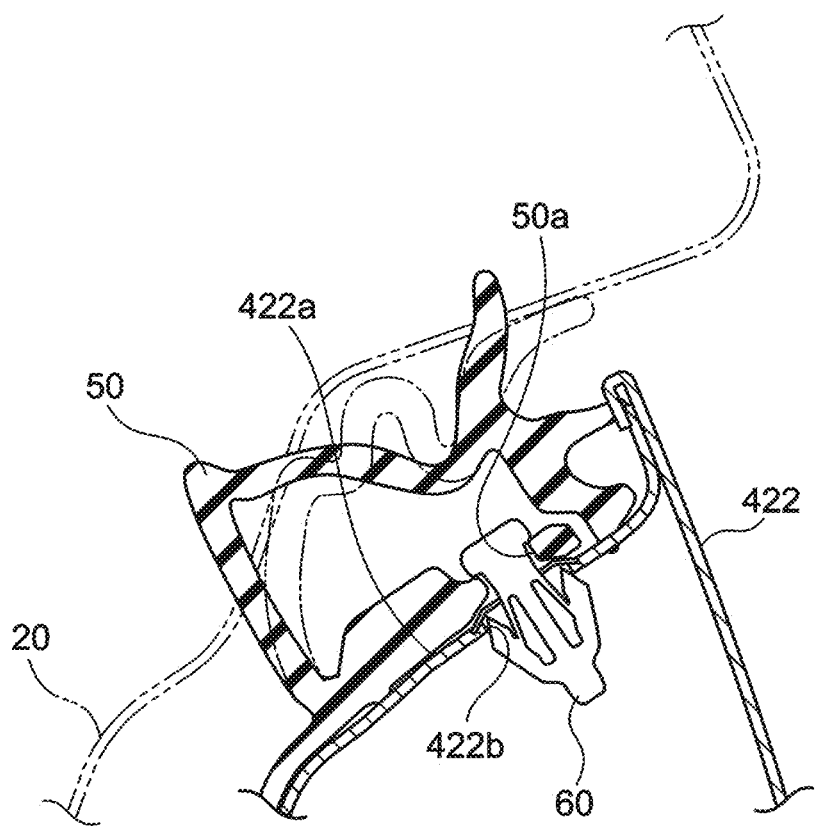
FIG. 5 illustrates a section taken along line V-V given in FIG. 2.
Figure 6:
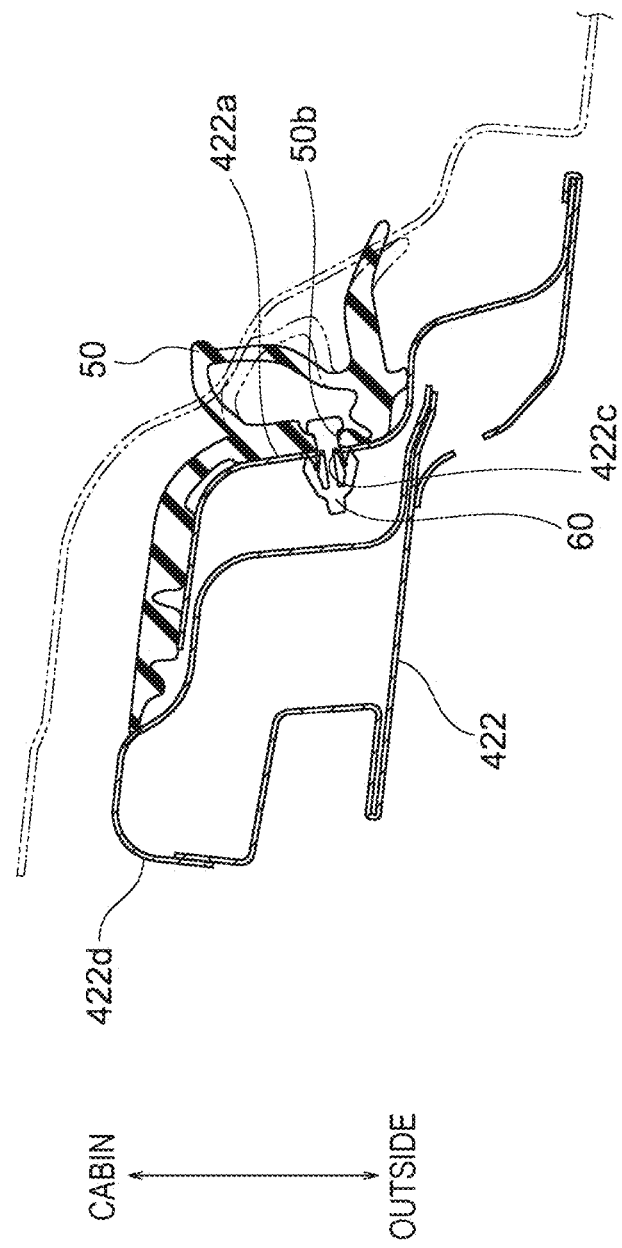
FIG. 6 illustrates a section taken along line VI-VI given in FIG. 2.

FIGS. 1 to 6 illustrate the embodiment of the disclosure. FIG. 1 is a side overview of an automobile vehicle. FIG. 2 is a side view of an upper rear part of a vehicle door seen from the vehicle cabin. FIG. 3 is an enlarged side view of a corner of the vehicle door seen from the vehicle cabin. FIG. 4 illustrates a section taken along line IV-IV given in FIG. 2. FIG. 5 illustrates a section taken along line V-V given in FIG. 2. FIG. 6 illustrates a section taken along line VI-VI given in FIG. 2.

Referring to FIG. 1, an automobile vehicle 10 includes front doors 30 and rear doors 40, with which front-seat openings and rear-seat openings provided in a vehicle body 20 are to be opened and closed, respectively. The vehicle body 20 includes A-pillars 21, B-pillars (not illustrated), C-pillars 22, roof rails 23, and side sills 24. Each of the front-seat openings is defined by a corresponding one of the A-pillars 21, a corresponding one of the roof rails 23, a corresponding one of the B-pillars, and a corresponding one of the side sills 24. Each of the rear-seat openings is defined by a corresponding one of the B-pillars, a corresponding one of the roof rails 23, a corresponding one of the C-pillars 22, and a corresponding one of the side sills 24. The vehicle body 20 further includes quarter panels 25, which are permanently affixed to the respective C-pillars 22 and form respective design faces. The quarter panels 25 each include a protrusion 26, which protrudes outward in the vehicle widthwise direction.

The vehicle door according to the disclosure is applied to each of the rear doors 40. The rear door 40 includes a door body 41, a sash 42, and a windowpane 43. The sash 42 is disposed at an upper part of the door body 41. An opening defined by the door body 41 and the sash 42 is to be opened and closed with the windowpane 43. The windowpane 43 is to be moved up and down by a regulator disposed inside the door body 41. In the present embodiment, the door body 41 includes an outer panel 411, with a protrusion 44 forming a design continuous with the protrusion 26 of the quarter panel 25.

Referring to FIG. 2, the sash 42 includes a first member 421, a second member 422, and a third member (not illustrated). The first member 421 is designed to extend along the roof of the vehicle body 20 at the rear-seat opening. The second member 422 is designed to extend along the C-pillar 22 of the vehicle body 20 at the rear-seat opening. The third member is designed to extend along the B-pillar of the vehicle body 20 at the rear-seat opening. The first member 421 and the second member 422 are joined to each other at a position near a corner 45, which forms the upper rear end of the outer edge of the rear door 40. The first member 421 and the third member are joined to each other at a corner 46, which forms the upper front end of the outer edge of the rear door 40. The first member 421 and the third member are obtained through roll forming. The second member 422 is obtained through press forming in such a manner as to include the corner 45.

As illustrated in FIG. 2, the rear door 40 is provided with a weatherstripping 50, which extends along the outer edge of the rear door 40 and is to be in contact with the vehicle body 20 in a state where the rear-seat opening is closed by the rear door 40. The weatherstripping 50 is made of an elastic material such as rubber. The weatherstripping 50 includes a first linear section 51, a second linear section 52, and a corner section 53. With the weatherstripping 50 attached to the rear door 40, the first linear section 51 extends along the roof of the vehicle body 20 at the rear-seat opening, and the second linear section 52 extends along the C-pillar 22 of the vehicle body 20 at the rear-seat opening. The corner section 53 is curved in such a manner as to couple the first linear section 51 and the second linear section 52 to each other. As illustrated in FIG. 2, the second linear section 52 and the corner section 53 lie on the second member 422. The first linear section 51 lies on the second member 422 at an end portion thereof that is near the corner section 53. The remaining portion of the first linear section 51 lies on the first member 421. Referring to FIG. 3, the first linear section 51 and the second linear section 52 are each provided on a side thereof near the corner section 53 with a clip 60, which prevents the weatherstripping 50 from moving relative to the rear door 40.

Referring to FIG. 4, on the side of the first linear section 51 that is opposite the corner section 53, the weatherstripping 50 is attached to the first member 421 of the sash 42. The first member 421 is formed of a single panel and through roll forming. In the present embodiment, the first member 421 includes a closed-section part 421a and a retainer part 421b. The weatherstripping 50 is fitted in the retainer part 421b. The retainer part 421b has a concave shape in sectional view with a narrowed opening. The retainer part 421b extends in the longitudinal direction of the first member 421. The weatherstripping 50 fitted in the retainer part 421b is movable in the direction in which the weatherstripping 50 extends (the direction is hereinafter referred to as "elongate direction"), and is therefore less likely to hinder the fitting work.

Referring to FIG. 5, on the side of the first linear section 51 that is near the corner section 53, the weatherstripping 50 is attached to the second member 422 of the sash 42 at a receiving surface 422a. The receiving surface 422a extends in the elongate direction of the weatherstripping 50 continuously from the side of the first linear section 51 that is near the corner section 53, along the corner section 53, to the side of the second linear section 52 that is near the corner section 53. The weatherstripping 50 is in close contact with the receiving surface 422a over an area from the side of the first linear section 51 that is near the corner section 53, along the corner section 53, to the side of the second linear section 52 that is near the corner section 53. The weatherstripping 50 is secured to the sash 42 by one of the clips 60 at a predetermined position on the side of the first linear section 51 that is near the corner section 53. In one embodiment, the clip 60 may serve as a "movement preventing member". For example, the clip 60 is secured to the second member 422 by being passed through a first hole 50a, provided in the weatherstripping 50, and through a first hole 422b, provided in the receiving surface 422a.

Referring to FIG. 6, the weatherstripping 50 is further secured to the sash 42 by the other clip 60 at a predetermined position on the side of the second linear section 52 that is near the corner section 53. For example, the clip 60 is secured to the second member 422 by being passed through a second hole 50b, provided in the weatherstripping 50, and through a second hole 422c, provided in the receiving surface 422a. In the present embodiment, the second member 422 includes a closed-section part 422d, which is formed of multiple panels that are separate from the panel forming the receiving surface 422a. Therefore, the second member 422 has a larger sectional area than being obtained through roll forming.

The second member 422 further includes a retainer part (not illustrated) in which the weatherstripping 50 is fitted on the side of the second linear section 52 that is opposite the corner section 53. This retainer part has a concave shape in sectional view with a narrowed opening, as with the retainer part 421b of the first member 421. The weatherstripping 50 fitted in this retainer part is movable in the elongate direction thereof. In the present embodiment, as illustrated in FIG. 2, the second linear section 52 extends astride the second member 422 of the sash 42 and an inner panel 412 of the door body 40. In the present embodiment, the inner panel 412 of the door body 41 also includes a retainer part in which the weatherstripping 50 is fitted.

In the rear door 40 configured as above, the weatherstripping 50 is attached to the first member 421 and the second member 422 in such a manner as to be movable in the elongate direction at the first linear section 51 and the second linear section 52. Therefore, the weatherstripping 50 is less likely to be excessively restrained to the sash 42. Thus, the weatherstripping 50 exhibits satisfactory followability with respect to the rear door 40. On the other hand, the weatherstripping 50 is secured to the sash 42 with the clips 60 on the two outer sides of the corner section 53. Therefore, the weatherstripping 50 is less likely to be displaced at the corner section 53. Thus, the sealability at the corner section 53 is increased. In addition, the second member 422 on which the corner section 53 of the weatherstripping 50 lies is obtained through press forming and therefore has higher rigidity than being obtained through roll forming. Such a configuration also increases the sealability at the corner section 53. Hence, a factor such as the variation in the work of attaching the weatherstripping 50 to the rear door 40 and an external input generated at the opening/closing of the rear door 40 is less likely to cause the weatherstripping 50 to be displaced at the corner section 53. Consequently, the probability of entry of water from the outside into the vehicle cabin is reduced.

Furthermore, the second linear section 52 of the weatherstripping 50 lies on the inner panel 412 of the door body 41 as well. Therefore, the weatherstripping 50 is less likely to bend at the boundary between the sash 42 and the door body 41. Such a configuration also increases the sealability of the weatherstripping 50. Furthermore, the second member 422 is obtained through press forming. Therefore, the door body 41 and the sash 42 that are coupled to each other form a smooth shape at the rear outer edge of the rear door 40. Hence, it is easy to lay the second linear section 52 on the inner panel 412.

Furthermore, the first member 421 is obtained through roll forming. Therefore, the sash 42 has a reduced sectional area at the first member 421. Furthermore, the corner 45 is included in the second member 422 that is obtained through press forming. Therefore, at the corner 45, the shape of a part where the weatherstripping 50 is attached and the external shape of the sash 42 are allowed to be designed independently of each other. Thus, the degree of freedom in designing the angle of the corner 45 of the rear door 40 is increased. For example, the angle may be made acuter than in the known art. Thus, the product appeal of the automobile vehicle 10 is increased.

In the case where the quarter panel 25 has the protrusion 26 as in the above embodiment, it may be particularly difficult to form the C-pillar 23 and the quarter panel 25 depending on the shape of the vehicle body 20 at the upper rear corner of the rear-seat opening. Nevertheless, since the second member 422 of the sash 42 of the rear door 40 is obtained through press forming, the corner 45 of the rear door 40 and the upper corner of the rear-seat opening are allowed to have such shapes that the C-pillar 23 and the quarter panel 25 are formable.

While the above embodiment relates to a case where the disclosure is applied to the corner 45 of the rear door 40 that is at the upper rear end, the disclosure may also be applied to the corner 46 of the rear door 40 that is at the upper front end or to the front door 30. While the above embodiment relates to a case where the clips 60 are disposed at two locations, the clips 60 may be disposed at three or more locations as long as each of the locations is defined on a side of the first linear section 51 or the second linear section 52 that is near the corner section 53. Moreover, any elements other than the clips 60 may alternatively be used to prevent the movement of the weatherstripping 50 relative to the sash 42.

While an embodiment of the disclosure has been described above, the above embodiment does not limit the disclosure defined by the appended claims. Note that not all of the combinations of the features of the above embodiment are essential as a solution to the problems addressed by the disclosure.

The invention claimed is:

1. A vehicle door with which an opening provided in a vehicle body of a vehicle is configured to be opened and closed, the vehicle door being provided with a weatherstripping that extends along an outer edge of the vehicle door and that is to be in contact with the vehicle body in a state where the opening is closed by the vehicle door, the vehicle door comprising:
   a sash disposed at an upper part of a door body,
   wherein the sash comprises
      a first member designed to extend along a roof of the vehicle body at the opening; and
      a second member joined to the first member at a position near a corner of the vehicle door and designed to extend along a pillar of the vehicle body at the opening,
   wherein the weatherstripping comprises
      a first linear section designed to extend along the roof of the vehicle body at the opening;
      a second linear section designed to extend along the pillar of the vehicle body at the opening; and
      a corner section curved in such a manner as to couple the first linear section and the second linear section to each other,
   wherein the first member is obtained through roll forming,
   wherein the second member is obtained through press forming in such a manner as to include the corner,
   wherein the second linear section and the corner section lie on the second member,
   wherein the weatherstripping is attached to the first member and to the second member such that the first linear section and the second linear section are movable in an elongate direction of the weatherstripping, and
   wherein the first linear section and the second linear section are each provided with a movement preventing member on a side near the corner section, the movement preventing member being configured to prevent the weatherstripping from moving relative to the sash.

2. The vehicle door according to claim 1,
   wherein the second linear section extends astride the second member of the sash and an inner panel of the door body.

3. The vehicle door according to claim 2,
   wherein the vehicle door is a rear door, and
   wherein the pillar is a C-pillar.

4. The vehicle door according to claim 3,
   wherein the vehicle body comprises a quarter panel that is permanently affixed to an outer panel of the C-pillar, and
   wherein the quarter panel comprises a protrusion that protrudes outward in a vehicle widthwise direction.

5. The vehicle door according to claim 1,
   wherein the movement preventing member comprises a clip that is in engagement with the weatherstripping and that is secured to the sash.

6. The vehicle door according to claim 2,
   wherein the movement preventing member comprises a clip that is in engagement with the weatherstripping and that is secured to the sash.

7. The vehicle door according to claim 3,
   wherein the movement preventing member comprises a clip that is in engagement with the weatherstripping and that is secured to the sash.

8. The vehicle door according to claim 4,
   wherein the movement preventing member comprises a clip that is in engagement with the weatherstripping and that is secured to the sash.

* * * * *